Patented Feb. 8, 1949

2,461,383

UNITED STATES PATENT OFFICE 2,461,383

COPOLYMERS OF ALPHA-ACETAMINO-ACRYLATES

Elias Isaacs and Herbert Gudgeon, Blackley, Manchester, England, assignors to Imperial Chemical Industries Limited, a corporation of Great Britain No Drawing. Application November 15, 1945, Serial No. 628,998. In Great Britain November 20, 1944

3 Claims. (Cl. 260—84)

This invention relates to new polymeric substances and more particularly it relates to new polymeric substances derived from esters of α-acetaminoacrylic acid.

According to the invention we manufacture new polymeric substances by causing esters of α-acetaminoacrylic acid to polymerise alone or together with other polymerisable unsaturated substances.

Esters of α-acetaminoacrylic acid may be made by the common esterification processes from α-acetaminoacrylic acid which itself is obtainable as described by Bergmann and Grafe (Zeitschrift für physiologische Chemie, 1930, vol. 187, page 187) by the action of acetic acid on αα-di-acetaminopropionic acid which results from the interaction of pyruvic acid and acetamide. Suitable esters for use in the process of the invention include for example methyl α-acetaminoacrylate, ethyl α-acetaminoacrylate and propyl α-acetaminoacrylate.

The polymerisation process of the invention may be carried out according to known techniques for the polymerisation of polymerisable unsaturated substances. Thus the polymerisation may be carried out in mass or in solution or in emulsion or dispersion in suitable solvents, for example in water or ethanol.

Catalysts may be used in the process, to effect polymerisation at greater speed, but they are not essential. Thus for example suitable catalysts include oxygen-yielding catalysts, for example benzoyl peroxide and ammonium persulphate.

If desired the speed of polymerisation may be still further activated when the polymerisation is conducted in aqueous medium by the presence in addition to an oxygen-yielding catalyst, of a compound capable of taking up molecular oxygen, especially an oxidisable sulphoxy compound, for example an oxidisable salt of an oxy-acid of sulphur, for example sodium sulphite.

As suitable polymerisable unsaturated substances which may be caused to polymerise along with the ester of α-acetaminoacrylic acid there may be mentioned for example acrylonitrile, methyl methacrylate and styrene.

The polymeric substances obtained according to the process of the invention are clear, hard and colourless resins. In cases where no second component is used in the polymerisation the products are, except when of very high molecular weight, soluble in water. These aqueous solutions are useful as thickening agents and stabilisers for natural and synthetic latices.

The polymers may also be used in the manufacture of photographic materials for example for subbing photographic supports, as anti-abrasion over-coatings for photographic emulsion layers, as anti-static and removable non-halation and filter layers for photographic films and plates and as the water-sensitive adhesive layer for stripping films and papers.

The invention is illustrated but not limited by the following examples in which the parts are by weight.

Example 1

Methyl α-acetamino acrylate is heated at 100° C. during 3 hours and a clear, colourless, hard, water-soluble resin is obtained in theoretical yield.

Example 2

Methyl α-acetamino acrylate (10 parts) and benzoyl peroxide (0.1 part) are heated at 100° C. during 3 hours. Ten parts of a clear, colourless resin similar to that of Example 1 are obtained.

Example 3

Methyl α-acetamino acrylate (10 parts) is dissolved in 50 parts of water containing 0.5 part of benzoyl peroxide and the solution is heated at 100° C. during 3 hours. A viscous solution of polymeric methyl α-acetamino acrylate is obtained.

Example 4

Methyl α-acetamino acrylate (1 part) and acrylonitrile (19 parts) are dissolved in distilled water (160 parts) from which air has been removed by boiling. Ammonium persulphate (1 part) and sodium sulphite (0.5 part) are added to the solution and the mixture is heated to 30° C. and so maintained during 16 hours while a slow stream of nitrogen is passed through the containing vessel. A colourless precipitate of interpolymer is formed which is filtered off, washed and dried. It is insoluble in water and in most organic solvents but dissolves readily in dimethylformamide.

We claim:

1. A process which comprises heating a solution comprising 1 part by weight of methyl α-acetamino acrylate, 19 parts of acrylonitrile, 1 part of ammonium persulfate and 0.5 part of sodium sulphite dissolved in water, at a temperature of about 30° C. for a period of about 16 hours, whereby to form a copolymer of methyl α-acetamino acrylate and acrylonitrile, and separating said copolymer from the reaction mixture.

2. A copolymer consisting of 5% by weight of methyl α-acetamino acrylate and 95% acrylonitrile.

3. A copolymer consisting of 5% by weight of an alkyl acetamino acrylate from the group consisting of methyl α-acetaminoacrylate, ethyl α-acetaminoacrylate and propyl α-acetaminoacrylate with 95% by weight of an alpha ethylenic compound from the group consisting of acrylonitrile, methyl methylmethacrylate, and styrene.

ELIAS ISAACS.
HERBERT GUDGEON.

REFERENCES CITED

The following references are of record in the file of this patent:

UNITED STATES PATENTS

| Number | Name | Date |
|---|---|---|
| 2,211,152 | Nicodemus | Aug. 13, 1940 |